United States Patent [19]

Lowe

[11] Patent Number: 4,698,114

[45] Date of Patent: Oct. 6, 1987

[54] APPARATUS FOR APPLYING STRIP REINFORCING TO SHEET MATERIAL

[75] Inventor: William F. Lowe, Bridgehampton, N.Y.

[73] Assignee: E-Z Machine Corp., Plainview, N.Y.

[21] Appl. No.: 829,800

[22] Filed: Feb. 14, 1986

[51] Int. Cl.$^4$ .......................... B32B 31/04; B32B 31/18
[52] U.S. Cl. .................................. 156/353; 156/354; 156/355; 156/362; 156/364; 156/517; 156/518; 156/522
[58] Field of Search ............... 156/353, 355, 362, 364, 156/510, 518, 522, 250, 354, 517

[56] References Cited

U.S. PATENT DOCUMENTS

| | | | |
|---|---|---|---|
| 2,248,744 | 7/1941 | Cohen ................................... | 156/353 |
| 2,864,285 | 12/1958 | Roselius ............................... | 156/522 |
| 3,479,242 | 11/1969 | Scott .................................... | 156/522 |
| 3,925,144 | 12/1975 | Lowe et al. .......................... | 156/518 |
| 3,926,713 | 12/1975 | Lowe et al. .......................... | 156/510 |
| 4,448,631 | 5/1984 | Eaton et al. .......................... | 156/354 |

Primary Examiner—Caleb Weston
Attorney, Agent, or Firm—Karl F. Ross; Herbert Dubno

[57] ABSTRACT

Means are provided for feeding a succession of sheets of a sheet material along a path in a transport direction, with means along the path for applying a reinforcing strip to a sheet advancing in the transport direction beginning substantially in alignment with a leading edge of the sheet, and a cutting device along the path for severing the strip while the strip is advancing in the transport direction so that a trailing edge of the strip will not project beyond the trailing edge of the sheet, the cutting device having a lower cutting blade fitting between the strip and the sheet over a portion of the strip before the strip meets the sheet, an upper cutting blade juxtaposed with the lower blade above the strip and arranged so that the blade cuts the strip progressively inwardly from at least one edge, with solenoid means responsive to the trailing edge of the sheet for impulsively driving the upper blade toward the lower blade, and an electric circuit including a capacitor for discharging through the solenoid means impulsively actuate same.

14 Claims, 13 Drawing Figures

APPARATUS FOR APPLYING STRIP REINFORCING TO SHEET MATERIAL

FIELD OF THE INVENTION

The present invention relates, in general, to apparatus for applying reinforcing of one material to a substrate sheet of another material, and, more particularly, to an apparatus for applying strip reinforcing along a margin of a sheet substrate and means for severing the strip at the trailing edge of the sheet.

BACKGROUND OF THE INVENTION

It is common practice in the paper art to provide holes or perforations along the margin of a sheet to allow the sheet to be accomodated in a ring binder or the like. It is also conventional, where the sheet is to be subjected to considerable use or stress, to provide a zone of reinforcing material at least around each hole or extending continuously along the perforated margin and thereby increase the tearing strength of the paper sheet in the region of the holes to prevent the sheet from becoming loose in the ring binder or similar system in which it is incorporated, a good example of such apparatus being disclosed in U.S. Pat. Nos. 3,925,144 and 3,926,713. However, a serious limitation with these apparatuses as well as with other similar apparatuses known in the art, is that the advance of the strip and substrate must be halted while the strip is being severed, hindering the rate at which these apparatuses can finish reinforced sheets.

In another known apparatus for applying strip reinforcing to sheet material, rather than stopping the advance of the strip and sheet during severing of the strip, the cutting device is displaced along with the strip and sheet while the strip is being severed and then shuttled back again to a starting point. The drawback with this particular approach is the complexity and difficulty in trying to maintain the coordination between the shuttling cutting device and the trailing edge of the sheet substrate, so that in practice, the strip is never severed flush with the trailing edge of the sheet but always leaves a slight overhang, which must be trimmed in a further step or folded under onto the other side of the sheet.

OBJECTS OF THE INVENTION

It is, therefore, an object of the present invention to provide an improved apparatus for applying strip reinforcing to sheet material in which the reinforcing strip and the sheet substrate can be continuously advanced while the strip is being severed.

It is another object of the invention to provide an apparatus in which the cutting device remains fixed in the longitudinal transport direction while the strip is being severed.

It is yet a further object of the inention to provide an apparatus in which the reinforcing strip can be severed at a longitudinal distance from the trailing edge of the sheet which is adjustable.

SUMMARY OF THE INVENTION

The above and other objects of the invention are met in an apparatus in which the substrate sheets are displaced from a feeder station into a tacking, cutting and sealing station which contains a supply of reinforcing film to be applied to the sheet, forming the reinforcing strip. As the sheet enters the station, the leading edge thereof triggers a microswitch or sensor which activates a single revolution, wrapped spring clutch which rotates a cam shaft. The cam shaft is operatively connected to several elements of the tacking, cutting and sealing station, one of which is the cutting device, which is retracted out of the path of the strip by the rotation of the cam shaft, which also acts to lower an upper tacking roller positioned above th epath of the strip, also lowering a strip guide for directing the strip into contact with the sheet while spring loading a lower tacking roller juxtaposed with the upper roller against a trip which holds the lower roller just clear of the upper roller and allows the sheet and strip to pass therebetween. As this happens, the sheet leading edge of the sheet is detected by an electric eye which triggers the discharge of a condenser into a solenoid operatively connected to the trip, releasing the spring loaded lower tacking roller against the upper tacking roller with the sheet and strip pressed therebetween, tacking the strip to the sheet at an adjustable distance from the leading edge thereof, the two tacking rollers maintaining contact until the sheet and strip are fed between sealing rollers downstream of the tacking rollers. As the single revolution cam shaft continues to turn, the upper tacking roller is then lifted, the guide strip is also lifted to provide spacing between the strip and the sheet upstream or past the tacking point therebetween, the cutting device is swung back into the path of the strip, with a lower blade of the device lying between the strip and sheet, and the spring pressure on the lower tacking roller is released, allowing the trip lever to reengage and completing the revolution of the cam shaft. As the sheet and strip continue to be conveyed in the transport direction, the trailing edge of the sheet is detected by another electric eye associated with the cutting device which triggers the discharge of another condenser into another solenoid operatively connected with an upper blade of the cutting device above the strip and juxtaposed with the stationary lower blade, driving the upper blade toward the lower blade or sever the strip at or at an adjustable distance inside from the trailing edge of the sheet. After the reinforced and trimmed sheet passes through the set of sealing rollers where the strip is bonded to the substrate, it is conveyed into a hole punching station where it is stopped, at which point a high speed punching unit driven by another single revolution, wrapped spring clutch triggered by another electric eye activating the discharge of another condenser into another solenoid operatively connected to the punching unit for high speed operation thereof punches the required holes. The punched reinforced sheet is then passed to a hopper.

Ordinarily, in machines of this type, the moving strip is never severed by a stationary cutting device for fear of tearing the strip already tacked and partially bonded to the sheet. However, in the present invention, this is what is done and achieved by operating the cutting device with a solenoid powered by the discharge of a condenser, which results in an almost instantaneous reaction of the cutting blades, severing the strip, starting from one longitudinal edge to the other, much more rapidly than heretofore achieved. In addition, the blades are arranged at a slight angle in projection at the plane of the strip to a perpendicular to the transport direction in the plane of the strip, whereby because of the angle and the motion of the strip, the cut is formed from edge to edge substantially perpendicular to the transport direction and the longitudinal edges of the strip.

BRIEF DESCRIPTION OF THE DRAWING

The above and other objects, features and advantages of the invention will become more readily apparent from the following description, reference being made to the accompanying drawing, in which.

SPECIFIC DESCRIPTION

Figure 1:
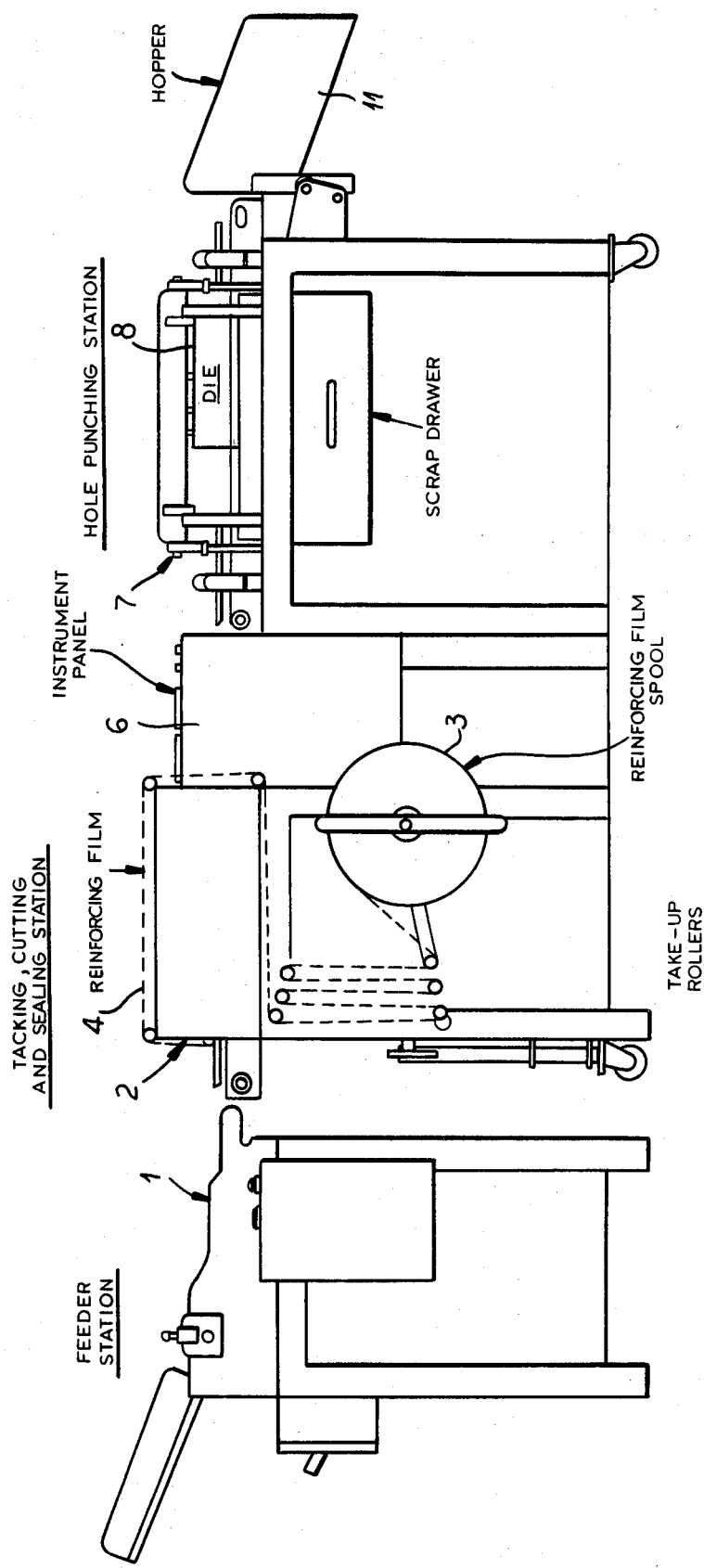
FIG. 1 is a front elevational view in a diagrammatic form of the apparatus according to the invention.
Figure 2:
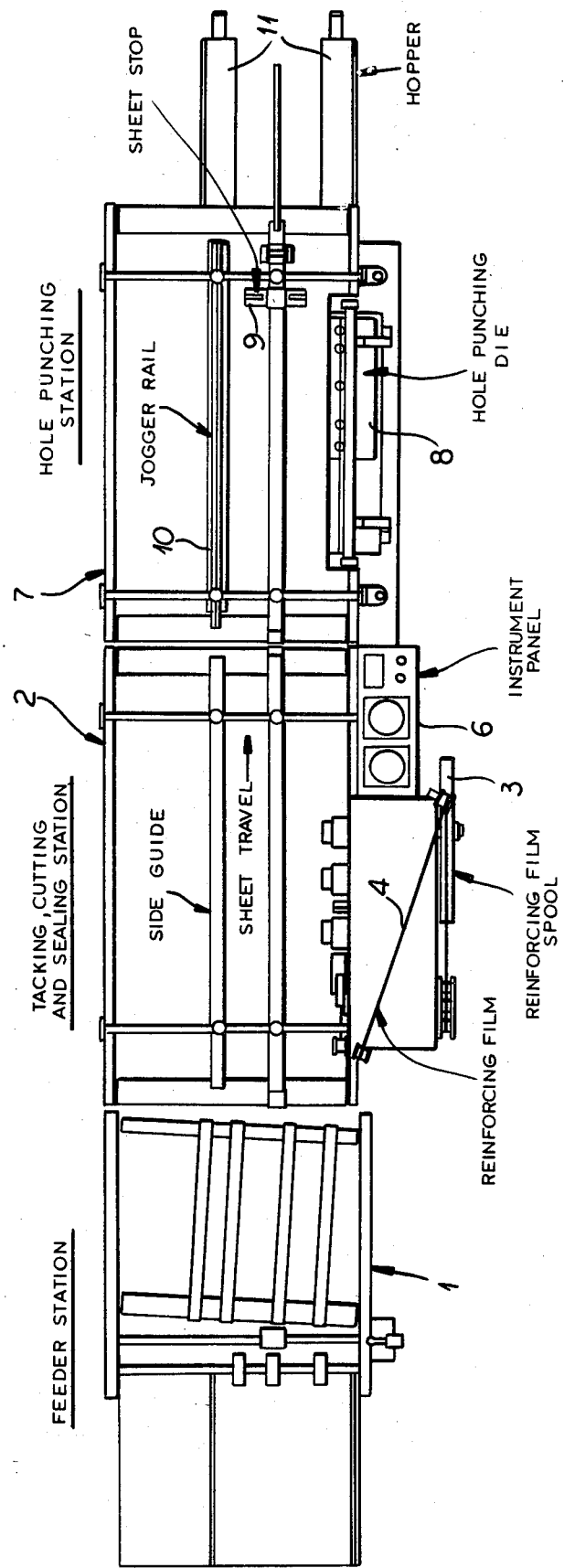
FIG. 2 is a top plan view thereof.
Figure 3:
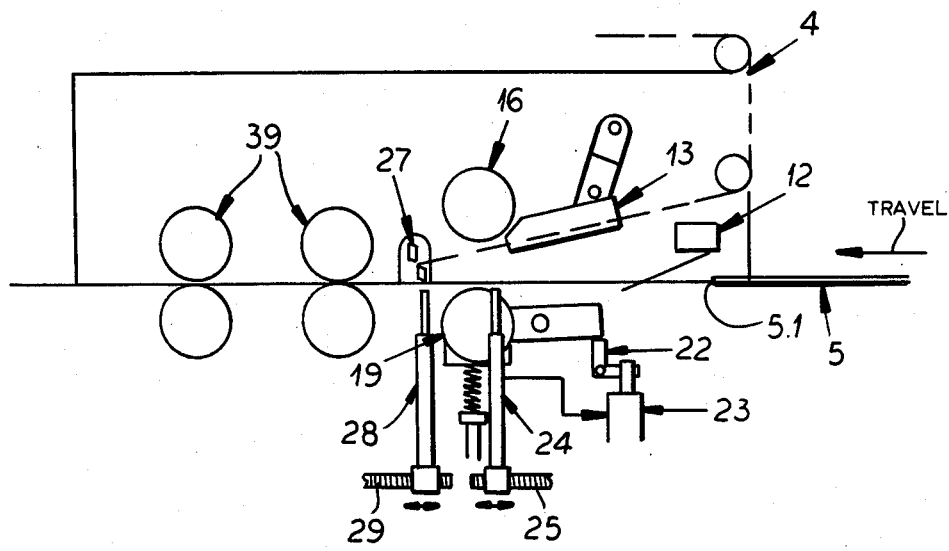
FIGS. 3 to 6 are rear elevational views in diagrammatic form showing in operational sequence the details of the tacking, cutting and sealing station of FIGS. 1 and 2.
Figure 6:
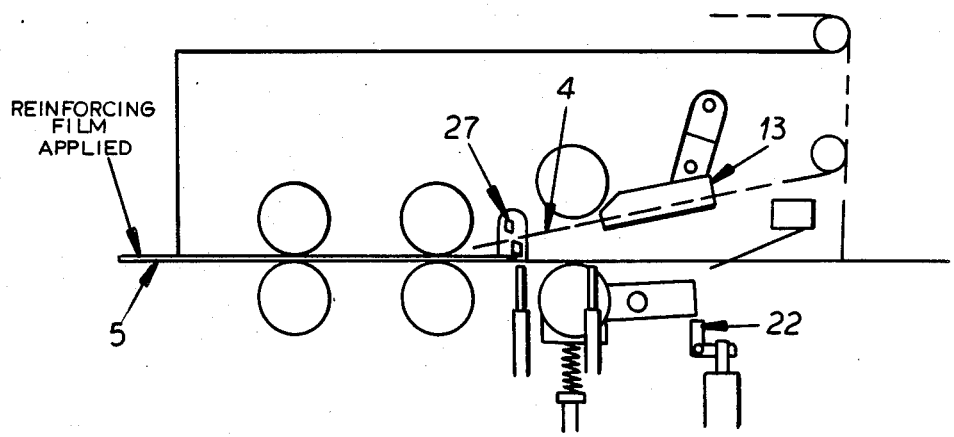
Figure 4:
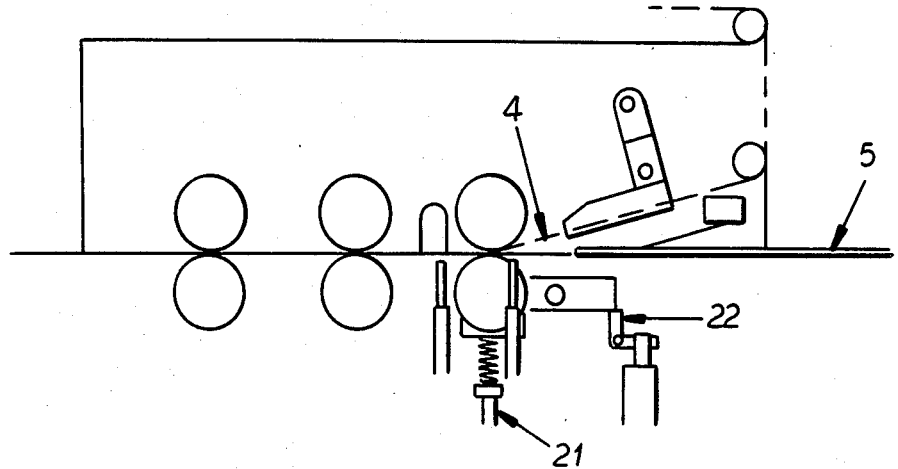
Figure 5:
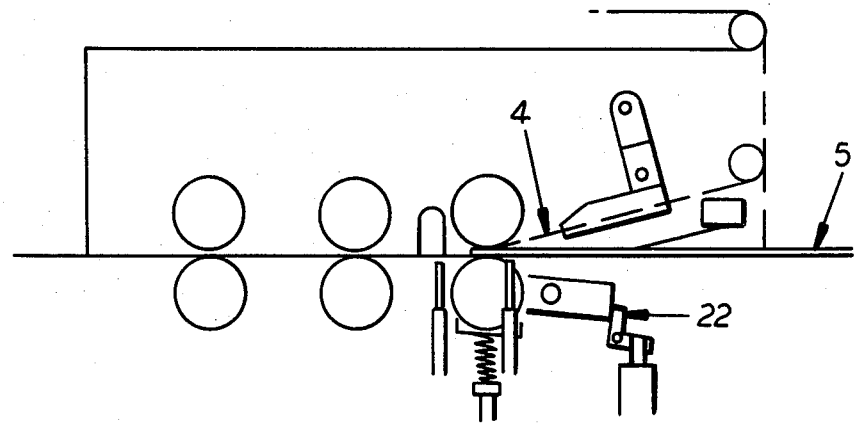

FIGS. 1 and 2 are overall views of the apparatus for applying strip reinforcing to sheet material, at the upstream end of which there is provided a feeder station 1 having the standard rollers and belts for conveying the sheet material to be reinforced to a tacking, cutting and sealing station 2 carrying a spool 3 of reinforcing film which is used as the reinforcing medium in the form of a strip 4 which is applied to the margin of substrate sheets 5 in the station 2 under the control of an instrument panel 6 also provided in the station. After a sheet is reinforced at the station 2 it is conveyed to a hole punching station 7 provided with a punching die 8, a sheet stop 9 and a jogger rail 10. Downstream of the station 7 a hopper 11 is provided for collecting the finished sheets.

With reference to FIGS. 3-7 which show in detail those elements of station 2 directly responsible for tacking, cutting and sealing of the reinforcing film to a substrate, there is provided a microswitch 12 engageable by the leading edge 5.1 of a sheet 5 and operatively connected to a single revolution, wrapped spring clutch 14 which rotates a cam shaft 15, an upper tacking roller 16 operatively connected to cam shaft 15 by a pushrod 17 for raising and lowering the roller, and a movable strip guide 13 operatively connected to the upper tacking roller 16 by an arm 18 for directing the strip 4 toward or away from the sheet 5. A lower tacking roller 19 is juxtaposed with the upper roller 16 and is biased upwardly by a spring 20 tensioned by the rotation of cam shaft 15 through the pushrod 21, the lower roller 19 being held in a cocked position against the spring tension by a trip lever 22 releasable by a solenoid 23, which is activated by an electric eye 24 upon detection of the leading edge 5.1 of a sheet 5 entering the space between the upper and lower rollers 16 and 19, the point of detection being adjustable by the displacement of the electric eye 24 in the transport direction along a threaded rod 25. The cam shaft 15 is also operatively connected by a pushrod 26 to a cutting device 27 to swing the device between an operative position shown in FIG. 8 and a retracted non operative position shown in FIG. 9. Another electric eye 28 associated with the cutting device 27 is provided along the transport and is adjustable in the transport direction by a threaded rod 29.

Figure 9:
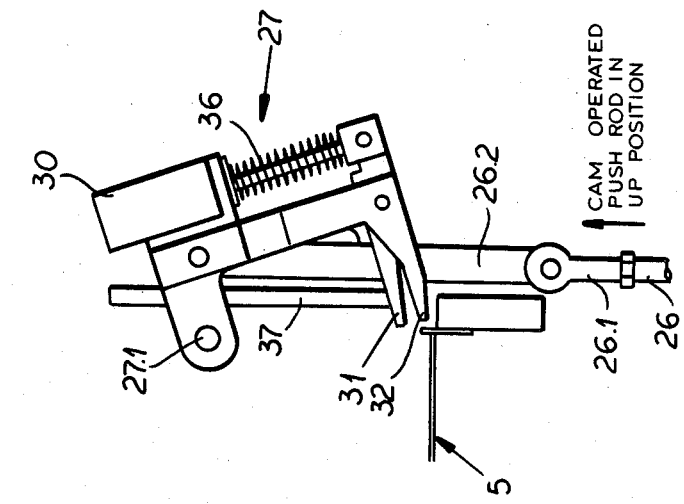
FIG. 9 is a view similar to FIG. 8 showing the cutting device in a retracted, non-operational position.

As can best be seen in FIGS. 8 and 9, the electric eye 28 is connected to a solenoid 30, which is operatively connected to the swingable upper blade 31 positioned above the strip 4 and coacting with the stationary lower blade 32 positioned below the strip 4 and on which the upper blade 31 is pivotally mounted to cut the strip 4 from one edge to another in a scissor-like manner. The solenoid 30 is connected to a D.C. power supply 33 which feeds through a condenser 34, which provides jolt of power to the solenoid when the electric switch 35 is closed upon detection of the trailing edge 5.2 of a sheet 5 by the electric eye 28 in alignment with the cutting device 27. The cutting device 27 is swingably mounted on pivot 27.1, which allows the device to be retracted into the non-operative position shown in FIG. 9 by the pushrod 26 connected by a swivel 26.1 to a connecting arm 26.2 pivotally connected to the cutting device 27. A compression spring 36 mounted between the solenoid 30 and the movable blade acts to bias the cutting blades in an open position. The cutting device 27 is further adjustable in the horizontal plane by the clamp 27.2 by which the device is mounted on an upright stanchoin 37, which allows the angle α of the projection of the blades on the strip 4 relative to the perpendicular to the transport direction to be changed, whereby the cut across the strip 4 can be formed substantially perpendicular to the transport direction by adjustment of this angle α relative to the velocity of the strip. Without this adjustment, the cut would be formed at an angle because of the motion of the strip.

Figure 11:
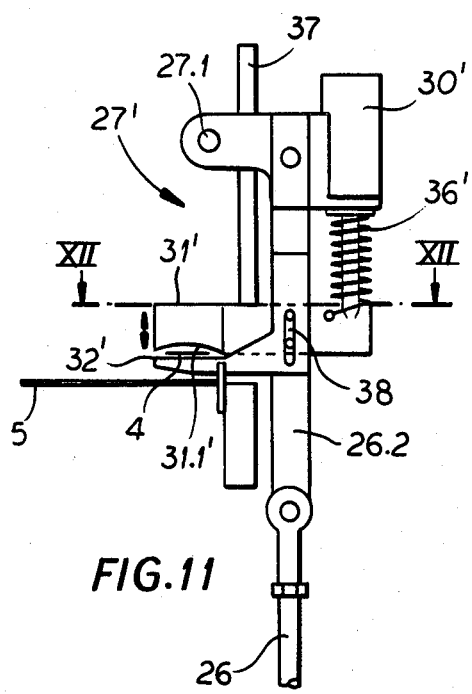
FIG. 11 is a view similar to FIG. 8 showing another embodiment of the invention.
Figure 12:
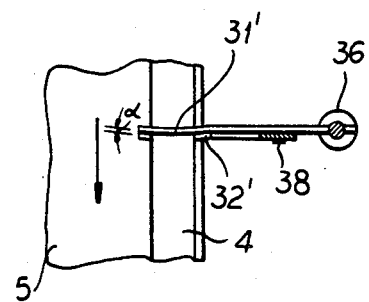
FIG. 12 is atop plan view thereof.

Another embodiment of the cutting device 27' is shown in FIGS. 11 and 12, in which the upper movable blade 31' is displaced vertically instead of pivotally by the solenoid 30' which acts against the restoring tension spring 36' to drive the blade 31' downwardly in a guide 38 toward the stationary blade 32'. The cutting edge 31.1' of the upper blade 31' is formed as a concave arc, whereby the cut is formed inwardly toward the center from each edge of the strip 4. To compensate for the motion of the strip, both blades 31' and 32' are bowed in the vertical plane in the transport direction, so that the tangent to the bow at the ends when projected onto the strip 4 forms the angle α with the perpendicular to the transport direction in the plane of the strip, whereby the combination of the velocity of the strip and the cutting angle α produce a substantially straight cut across the strip.

Figure 13:
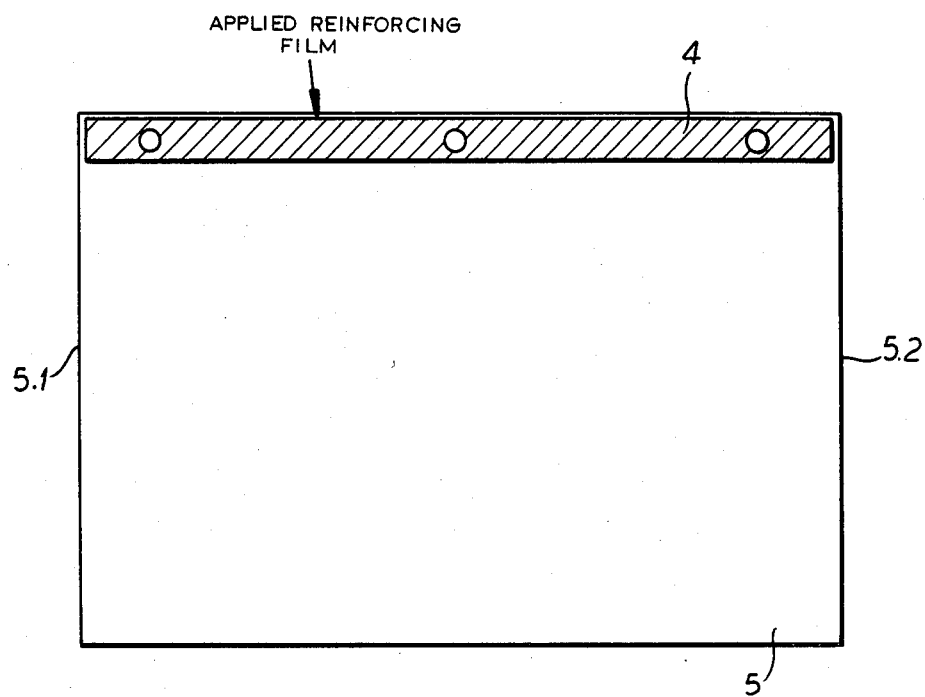
FIG. 13 is a plan view of a finished reinforced sheet.

A finished sheet 5 having a reinforced marginal strip 4 in which the holes have been punched is shown in FIG. 13.

Just beyond the cutting device 27 in the downstream direction in the tacking, cutting and sealing station 2, there is provided a set of metallic sealing rollers 39 through which the sheet 5 with the applied strip 4 is passed, the rollers 39 being contacted by electrical brushes 40 which supply heating current to the rollers 39 for sealing the strip 4 to the substrate sheet 5 as it passes through, thereby bonding the strip to the sheet.

In the operation of the apparatus, the substrate sheets 5 are displaced from the feeder station 1 into the tacking, cutting and sealing station 2, which contains a supply of Mylar film on a spool 3 to be applied to the sheet 5, forming the reinforcing strip 4. As the sheet enters the station 2, the leading edge 5.1 thereof triggers the microswitch 12 which activates the single revolution, wrapped spring clutch 14 which rotates the cam shaft 15. The cam shaft 15 is operatively connected by the pushrods to several elements of the station 2, one of which is the cutting device 27 operated by the pushrod 26 and connecting arm 26.2, which acts to retract the cutting device out of the path of the advancing strip 4 by the rotation of the cam shaft 15, which also acts through the pushrod 17 to lower the upper tracking roller 16 positioned above the path of the strip 4, the upper tacking roller 16 being operatively connected to the strip guide 13 by the arm 18, so that when the roller 16 is lowered the strip guide 13 is also lowered and directs the strip 4 into contact with the sheet 5 while spring loading the lower tacking roller 19 with a compression spring 20 acted on by the pushrod 21, the spring loaded roller 19 being held in a cocked position just clear of the upper roller 16 by the strip level 22. As the leading edge 5.1 of the sheet 5 with the strip 4 passes between the upper and lower tacking rollers, it is detected by the electric eye 24 which triggers the discharge of a condenser, similar to the one illustrated in FIG. 8 into the solenoid 23 operatively connected to the trip lever 22, releasing the spring loaded lower tacking roller 19 against the upper tacking roller 16 with the sheet and strip pressed therebetween, thereby tacking the strip 4 to the sheet 5 at a distance from the leading edge 5.1 which is adjustable by shifting the electric eye 24 in the transport direction using the threaded rod 25. The upper and lower tacking rollers maintain contact with the sheet and strip therebetween until the sheet and strip are fed between the sealing rollers 39 where the strip 4 is bonded to the sheet 5 by heat.

As the single revolution cam shaft 15 continues to turn, the upper tacking roller 16 is then lifted along with the strip guide 13 to provide spacing between the strip 4 and sheet 5 upstream or past the tacking point therebetween allowing the cutting device 27 to be swung into the path of the strip with the lower blade 32 thereof lying between the strip 4 and the sheet 5, while at the same time the spring pressure on the lower tacking roller 19 is relieved, allowing the trip lever 22 to reengage in the cocked position of the lower tacking roller 19 and completing one revolution of the cam shaft 15. As the sheet and strip continues to be conveyed in the transport direction, the trailing edge 5.2 of the sheet 5 is detected by another electric eye 28 associated with the cutting device 27 and which triggers the discharge of another condenser, similar to the one illustrated in FIG. 8, into the solenoid 30 operatively connected with the upper cutting blade 31 of the cutting device 27, above the strip 4 and juxtaposed with the stationary lower blade 32, driving the upper blade 31 toward the lower blade 32 to sever the strip 4 at or at an adjustable distance inside from the trailing edge 5.2 of the sheet 5, the distance from the trailing edge 5.2 being adjustable by shifting the electric eye 28 in the transport direction using the other threaded rod 29.

Figure 7:
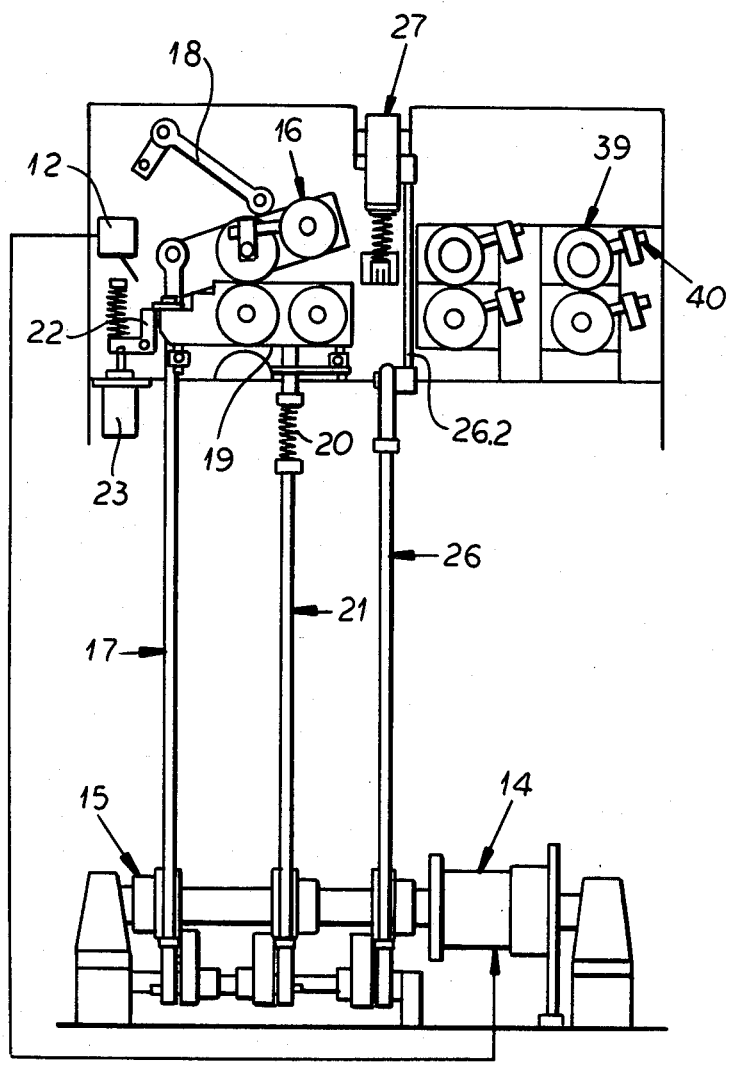
FIG. 7 is a view similar to FIGS. 3-6 showing further details of the station.
Figure 8:
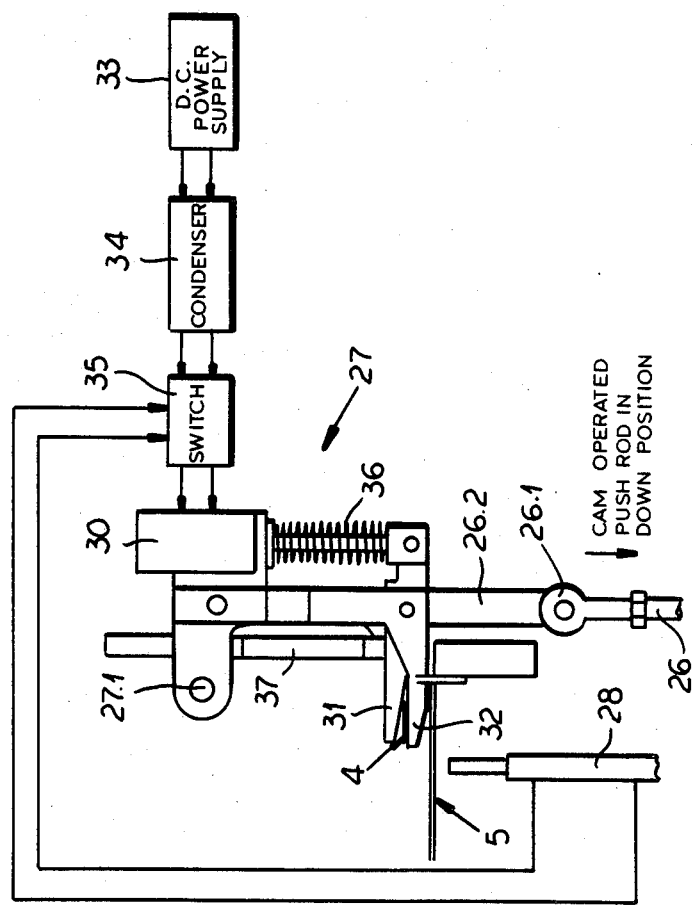
FIG. 8 is a detail view of the cutting device according to the invention in an operational position.
Figure 10:
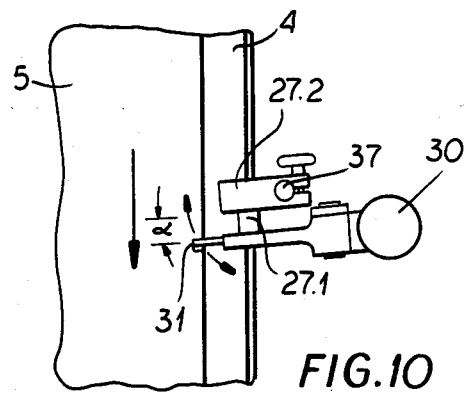
FIG. 10 is a top plan view of FIG. 8.

After the reinforced and trimmed sheet 5 passes through the set of sealing rollers 39 where the strip 4 is bonded to the substrate 5, it is conveyed into the hole punching station 7 where it is stopped by the sheet stop 9 jogged into register by the jogger rail 10, at which point a high speed punching unit 8 driven by another single revolution, wrapped spring clutch similar to the one illustrated in FIG. 7, is triggered by another electric eye activating the discharge of another condenser into another solenoid arranged in a circuit similar to that illustrated in FIG. 8, the solenoid being operatively connected to the punching unit 8 for high speed punching of the holes in the reinforcing stacked sheets. After punching, the sheets is passed to a hopper 11 for collection.

The operation of all of the stations of the apparatus as well as the coordination thereof is under the control of the instrument panel 6, which monitors all aspects of the operation, including those which are semiautomatic.

I claim:

1. An apparatus for applying a reinforcing strip to sheet material comprising:
   means for feeding a succession of sheets of said sheet material along a path in a transport direction;
   means along said path for applying said strip to a sheet advancing in the transport direction beginning substantially in alignment with a leading edge of said sheet;
   a cutting device along said path for severing said strip while said strip is advancing in the transport direction so that a trailing edge of said strip will not project beyond the trailing edge of said sheet, said cutting device comprising:
   a lower cutting blade fitting between said strip and said sheet, over a portion of said strip before said strip meets said sheet,
   an upper cutting blade juxtaposed with said lower blade above said strip and arranged so that said blade cuts said strip progressively inwardly from at least one edge,
   solenoid means responsive to the trailing edge of said sheet for impulsively driving said upper blade toward said lower blade, and
   an electric circuit including a capacitor for discharging through said solenoid means to impulsively actuate same; and
   means operatively connected to said cutting device for shifting said upper and lower cutting blades into and out of the path of said strip.

2. An apparatus for applying a reinforcing strip to sheet material comprising:
   means for feeding a succession of sheets of said sheet material along a path in a transport direction;
   means along said path for applying said strip to a sheet advancing in the transport direction beginning substantially in alignment with a leading edge of said sheet;
   a cutting device along said path for severing said strip while said strip is advancing in the transport direction so that a trailing edge of said strip will not project beyond the trailing edge of said sheet, said cutting device comprising:
   a lower cutting blade fitting between said strip and said sheet, over a portion of said strip before said strip meets said sheet,
   an upper cutting blade juxtaposed with said lower blade above said strip and arranged so that said blade cuts said strip progressively inwardly from at least one edge,
   solenoid means responsive to the trailing edge of said sheet for impulsively driving said upper blade toward said lower blade, and
   an electric circuit including a capacitor for discharging through said solenoid means to impulsively actuate same; said upper blade being formed with a concave cutting edge cooperating with a straight cutting edge formed on said lower blade, said upper blade being linearly displaceable with respect to said lower blade, said upper blade being bowed in the plane thereof and said lower blade being bowed in the plane thereof complimentary to the bow of said upper blade, and the projection of a tangent at each end of the respective bows of said upper and lower blades at the plane of said strip forms an angle with a perpendicular to the transport direction of said strip at the plane thereof, said angle being determined by the velocity of said strip in the transport direction whereby said cut is formed substantially perpendicular to the transport direction progressively inwardly from both edges of said strip.

3. An apparatus for applying a reinforcing strip to sheet material comprising:
 means for feeding a succession of sheets of said sheet material along a path in a transport direction;
 means along said path for applying said strip to a sheet advancing in the transport direction beginning substantially in alignment with a leading edge of said sheet;
 a cutting device along said path for severing said strip while said strip is advancing in the transport direction so that a trailing edge of said strip will not project beyond the trailing edge of said sheet, said cutting device comprising:
 a lower cutting blade fitting between said strip and said sheet, over a portion of said strip before said strip meets said sheet,
 an upper cutting blade juxtaposed with said lower blade above said strip and arranged so that said blade cuts said strip progressively inwardly from at least one edge,
 solenoid means responsive to the trailing edge of said sheet for impulsively driving said upper blade toward said lower blade, and
 an electric circuit including a capacitor for discharging through said solenoid means to impulsively actuate same; and
 means operatively connected to said cutting device for shifting said upper and lower cutting blades into and out of the path of said strip, said upper cutting blade being angularly displaceable with respect to said lower cutting blade and respective cooperating cutting edges of said upper and lower blades are straight and the angle of the projection of said blades at the plane of said strip with the perpendicular to the transport direction at the plane of said strip is adjustable with respect to the velocity of said strip in the transport direction, whereby said cut is formed substantially perpendicular to the transport direction.

4. The apparatus defined in claim 1 wherein said electric circuit further includes a switch operatively connected to said capacitor and first sensor means operatively connected to said switch for detecting said trailing edge of said sheet, said first sensor means being displaceable in the transport direction for adjusting the distance from said trailing edge at which said strip is cut.

5. The apparatus defined in claim 4 wherein said means for applying said strip includes second sensor means along said path upstream of said cutting device for detecting said sheet, and a movable strip guide along said path between said cutting device and said second sensor means and responsive thereto for directing said strip into contact with said sheet upon detection thereof.

6. The apparatus defined in claim 5 wherein said second sensor is formed by a microswitch.

7. The apparatus defined in claim 5 wherein said means for applying said strip further includes movable upper tacking means along said path above said strip and sheet and spaced apart therefrom between said cutting means and said strip guide and responsive to said second sensor for assuming a lowered positinclosely spaced from said strip and sheet upon detection of said sheet, movable lower tacking means along said path below said sheet and closely spaced therefrom between said cutting means and said strip guide and juxtaposed with said upper tacking means, said lower tacking means being spring biased toward said upper tacking means in response to said second sensor means, and means for releasably retaining said lower tacking means and responsive to the leading edge of said sheet for releasing said lower tacking means upon detection of said leading edge, whereby said lower tacking means is discharged against said upper tacking means with said sheet and strip pressed therebetween for tacking said strip to said sheet thereat.

8. The apparatus defined in claim 7 wherein said means for releaseably retaining said lower tacking means includes a trip lever engageable with said lower tacking means, third sensor means along said path between said upper and lower tacking means and said strip guide for detecting said leading edge, and second solenoid means operatively connected to said trip lever and said third sensor means for releasing said lower tacking means in response to the detection of said leading edge by said third sensor means, said third sensor means being displaceable in the transport direction for adjusting the distance from said leading edge at which said strip is tacked to said sheet.

9. The apparatus defined in claim 8 wherein said means for applying said strip further includes sealing means along said path downstream of said cutting device and engageable with said sheet and strip for bonding said strip to said sheet.

10. The apparatus defined in claim 7 wherein said means for applying said strip further includes cam means responsive to said second sensor means and operatively connected respectfully to said strip guide for directing said strip, to said upper tacking means for raising and lowering same, to spring bias said lower tacking means, and to said cutting device for shifting said blades.

11. The apparatus defined in claim 10 wherein said cam means comprises a cam shaft driven by a single revolution wrapped-spring clutch activated by said second sensor means.

12. The apparatus defined in claim 11 wherein said cam shaft is operatively connected to said strip guide, said upper tacking means, to spring bias said lower tacking means, and to said cutting device by respective pushrods.

13. The apparatus defined in claim 9 wherein said upper and lower tacking means and said sealing means are formed by respective rollers.

14. The apparatus defined in claim 8 wherein said first and third sensor means are formed respectively by an electric eye displaceable along a threaded rod.

* * * * *